(12) United States Patent
Byrne et al.

(10) Patent No.: US 10,615,968 B1
(45) Date of Patent: Apr. 7, 2020

(54) SHUFFLING CRYPTOGRAPHIC KEYS STORED IN CLOUDS OF A MULTI-CLOUD ENVIRONMENT

(71) Applicant: EMC IP Holding Company LLC, Hopkinton, MA (US)

(72) Inventors: Andrew Byrne, Castlemartyr (IE); Donagh A. Buckley, Banteer (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 293 days.

(21) Appl. No.: 15/887,512

(22) Filed: Feb. 2, 2018

(51) Int. Cl.
*H04L 9/08* (2006.01)
*H04L 9/06* (2006.01)
*G06F 16/22* (2019.01)

(52) U.S. Cl.
CPC ........ *H04L 9/0822* (2013.01); *G06F 16/2246* (2019.01); *H04L 9/0643* (2013.01); *H04L 9/0894* (2013.01)

(58) Field of Classification Search
CPC ... H04L 9/0822; H04L 9/0894; H04L 9/0643; G06F 16/2246
See application file for complete search history.

(56) References Cited

U.S. PATENT DOCUMENTS

| | | | | |
|---|---|---|---|---|
| 10,372,926 B1* | 8/2019 | Leshinsky | ............. | H04L 9/0822 |
| 2011/0289061 A1* | 11/2011 | Lew | .................... | G06F 16/2272 |
| | | | | 707/696 |
| 2014/0270164 A1* | 9/2014 | Aggarwal | ............. | H04L 9/0816 |
| | | | | 380/46 |
| 2018/0287792 A1* | 10/2018 | Fu | ......................... | H04L 9/0897 |

OTHER PUBLICATIONS

Cloud Key Management Service/Google Cloud Platform, "Cloud Key Management Service: Manage encryption keys on Google Cloud Platform," https://cloud.google.com/kms/, Jan. 29, 2018, 6 pages.
S. De Capitani Di Vimercati et al., "Efficient and Private Access to Outsourced Data," IEEE 31st International Conference on Distributed Computing Systems (ICDCS) Jun. 20-24, 2011, 10 pages.

(Continued)

*Primary Examiner* — Christopher C Harris
(74) *Attorney, Agent, or Firm* — Ryan, Mason & Lewis, LLP

(57) ABSTRACT

A method includes receiving, at a key management system from one or more client devices, one or more requests for cryptographic keys stored in respective clouds of a plurality of cloud service providers in a multi-cloud environment, the cryptographic keys being distributed across different ones of the respective clouds of the plurality of cloud service providers in the multi-cloud environment. The method also includes determining a location of a given one of the requested cryptographic keys on one or more of the clouds of the cloud service providers in the multi-cloud environment, retrieving the given cryptographic key from the determined location in the multi-cloud environment, providing the given cryptographic key to a given one of the client devices, and shuffling the distribution of the cryptographic keys across the clouds of the plurality of cloud service providers in the multi-cloud environment.

20 Claims, 8 Drawing Sheets

(56) References Cited

OTHER PUBLICATIONS

Key Management Service—Amazon Web Services (AWS), "AWS Key Management Service (KMS): Easily create and control the keys used to encrypt your data," https://aws.amazon.com/kms/, Jan. 29, 2018, 3 pages.

S. De Capitani Di Vimercati et al., "Shuffle Index: Efficient and Private Access to Outsourced Data," ACM Transactions on Storage (TOS), Oct. 2015, vol. 11, No. 4, 55 pages.

* cited by examiner

US 10,615,968 B1

SHUFFLING CRYPTOGRAPHIC KEYS STORED IN CLOUDS OF A MULTI-CLOUD ENVIRONMENT

FIELD

The field relates generally to information security, and more particularly to management of cryptographic keys.

BACKGROUND

Information processing systems increasingly utilize reconfigurable virtual resources to meet changing user needs in an efficient, flexible and cost-effective manner. For example, cloud computing and storage systems implemented using virtual machines have been widely adopted. Other virtual resources now coming into use in information processing systems include Linux containers. Such containers may be used to provide at least a portion of the virtualization infrastructure of a given information processing system. However, significant challenges arise in deployment of virtualization infrastructure in multi-tenant environments. For example, it can be difficult to manage protection of data stored in multi-tenant environments such as cloud computing environments. Further there are various difficulties associated with establishing trust in key management services operating in multi-tenant environments.

SUMMARY

Illustrative embodiments of the present invention provide techniques for protection of cryptographic keys through the use of a shuffle index. Embodiments advantageously provide enhanced security for managing cryptographic keys in multi-cloud and other multi-tenant environments.

In one embodiment, a method comprises receiving, at a key management system from one or more client devices, one or more requests for cryptographic keys stored in respective clouds of a plurality of cloud service providers in a multi-cloud environment, the cryptographic keys being distributed across different ones of the respective clouds of the plurality of cloud service providers in the multi-cloud environment. The method also comprises determining a location of a given one of the requested cryptographic keys on one or more of the clouds of the cloud service providers in the multi-cloud environment, retrieving the given cryptographic key from the determined location in the multi-cloud environment, providing the given cryptographic key to a given one of the client devices, and shuffling the distribution of the cryptographic keys across the clouds of the plurality of cloud service providers in the multi-cloud environment. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As discussed above, multi-cloud environments are coming into widespread use. One key challenge in multi-cloud environments is establishing trust in a Key Management System (KMS) operating in a multi-cloud environment. As more and more operations are outsourced to cloud service providers, so too are key management services. Key management services are established to manage the protection of customer or user data in the multi-cloud environment, and to manage keys that are used to set up secure communication channels between clients and cloud services.

Figure 1:
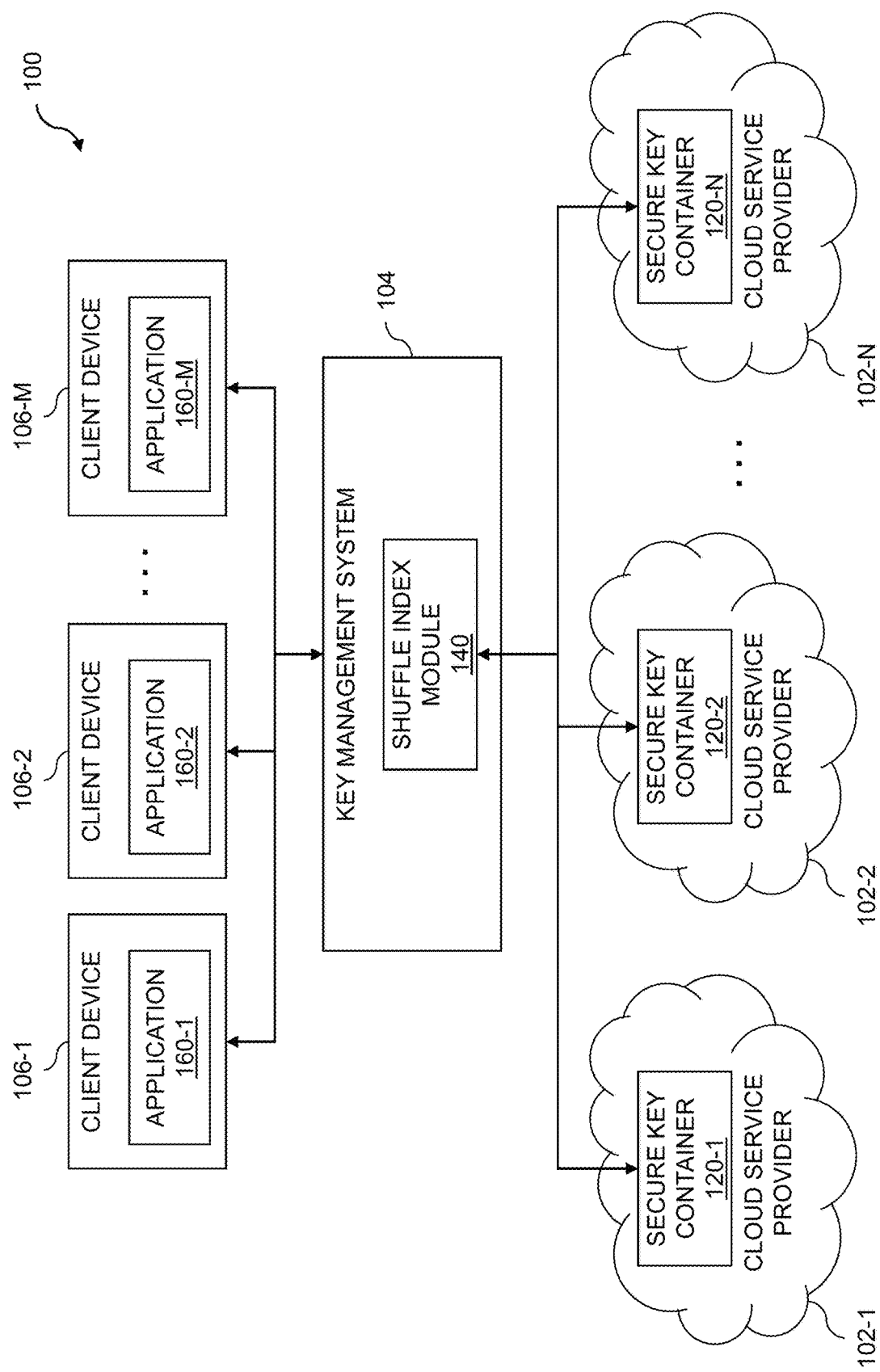
FIG. 1 is a block diagram of an information processing system for key shuffling in a multi-cloud environment in an illustrative embodiment of the invention.

FIG. 1 shows an information processing system 100 configured in accordance with an illustrative embodiment. The information processing system 100 comprises a multi-cloud environment which implements shuffling to distribute keys amongst clouds of multiple cloud service providers 102-1, 102-2, . . . 102-N (collectively, cloud service providers (CSPs) 102). The CSPs 102 may operate or provide respective private clouds, public clouds, hybrid clouds including both public and private clouds, and various other arrangements.

A given one of the CSPs 102 may provide just a single cloud, or multiple clouds. In addition, each cloud operated or provided by a given CSP may store multiple cryptographic keys or portions thereof. For clarity, various references to CSPs herein should be understood to refer to the clouds operated or provided by the CSPs. For example, references to storing cryptographic keys in CSPs should be understood to refer to storing cryptographic keys in the clouds operated or provided by the CSPs. Similarly, indications that elements are coupled or otherwise connected to CSPs should be understood to refer to coupling or other connection to the clouds operated or provided by the CSPs.

A KMS 104 is coupled to the CSPs 102, and implements a shuffle index module 140 that provides obfuscation between logical key requests from client devices 106-1, 106-2, . . . 106-M (collectively, client devices 106) and the physical location of keys stored in secure containers 120-1, 120-2, . . . 120-N (collectively, secure containers 120) implemented on CSPs 102.

The term "shuffling" as used herein represents moving the physical location of multiple cryptographic keys. For example, in some embodiments, shuffling involves moving the physical locations of multiple cryptographic keys in response to one or more requests for access to one or more of the multiple cryptographic keys. The shuffling generally involves movement of a requested cryptographic key or keys (or portions thereof) as well as the movement of additional keys (or portions thereof) that are not subject to one or more access requests, so as to provide obfuscation between the key access requests and the physical locations of the keys. The movement of keys during a shuffle includes movement of keys or portions thereof between different CSPs, although in some embodiments the movement of keys during a shuffle further includes movement of the physical location of keys or portions thereof within a given CSP.

In some embodiments, all keys that are stored by CSPs are moved during each shuffling. In other embodiments, a subset of the keys that are stored by the CSPs are moved during each shuffling. The movement of keys as part of the shuffling is random or pseudo-random, such that an attacker cannot discern patterns of movement of any particular key or keys from CSP to CSP during multiple rounds of shuffling. By shuffling additional keys that are not part of or the subject of one or more access requests during each shuffle, further protection is provided as an attacker is not able to discern ownership or association of particular keys with particular requesting users or applications.

The secure containers 120 provide secure storage for cryptographic keys (e.g., provide confidentiality and integrity protection). In some embodiments, the KMS 104 implementing shuffle index module 140 is implemented on an additional CSP separate from CSPs 102. The KMS 104 implementing shuffle index module 140 in other embodiments may be implemented at least partially internal to one or more of the client devices 106.

The client devices 106 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 106 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The client devices 106-1, 106-2, . . . 106-M implement respective applications 160-1, 160-2, . . . 160-M (collectively, applications 160). The client devices 106 request keys from the KMS 104, and the KMS 104 provides keys stored in the secure containers 120 of CSPs 102 to the applications 160 on client devices 106 in response, assuming the requests are successfully authenticated.

Although not shown, the CSPs 102, KMS 104 and client devices 106 may be connected via one or more networks. Such networks may comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the CSPs 102, KMS 104 and client devices 106, as well as to support communication between such elements and other related systems and devices not explicitly shown.

As mentioned above, the shuffle index module 140 of KMS 104 is configured to provide a shuffling mechanism that provides obfuscation between logical key requests received from client devices 106 and applications 160 and the physical location of the requested keys in the secure containers 120 of CSPs 102. As will be described in further detail below, the keys may be distributed amongst the secure containers 120 of CSPs 102, and may be redistributed or shuffled between the different secure containers 120 of CSPs 102 as directed by the shuffle index module 140. In some embodiments, keys are shuffled after each key request. In other embodiments, keys may be shuffled after each n key requests, where n is an integer greater than one. The keys may also be shuffled on a schedule, such as periodically regardless of the number of key requests. Various details regarding key shuffling will be described in further detail below with respect to FIGS. 2-5.

It is to be appreciated that the particular arrangement of the CSPs 102, KMS 104 and client devices 106 illustrated in the FIG. 1 embodiment is presented by way of example only, and alternative arrangements can be used in other embodiments. As discussed above, for example, the KMS 104 may be implemented on an additional CSP, or within one or more of the client devices 106. In addition, functionality associated with the shuffle index module 140 may in some embodiments be separated across multiple modules with the multiple modules possibly being implemented with multiple distinct processors or processing devices.

The shuffle index module 140, or portions thereof, may be implemented at least in part in the form of software that is stored in memory and executed by a processor.

It is to be understood that the particular set of elements shown in FIG. 1 for implementing key shuffling in a multi-cloud environment is presented by way of illustrative example only, and in other embodiments additional or alternative elements may be used. Thus, another embodiment may include additional or alternative systems, devices and other network entities, as well as different arrangements of modules and other components.

Figure 2:
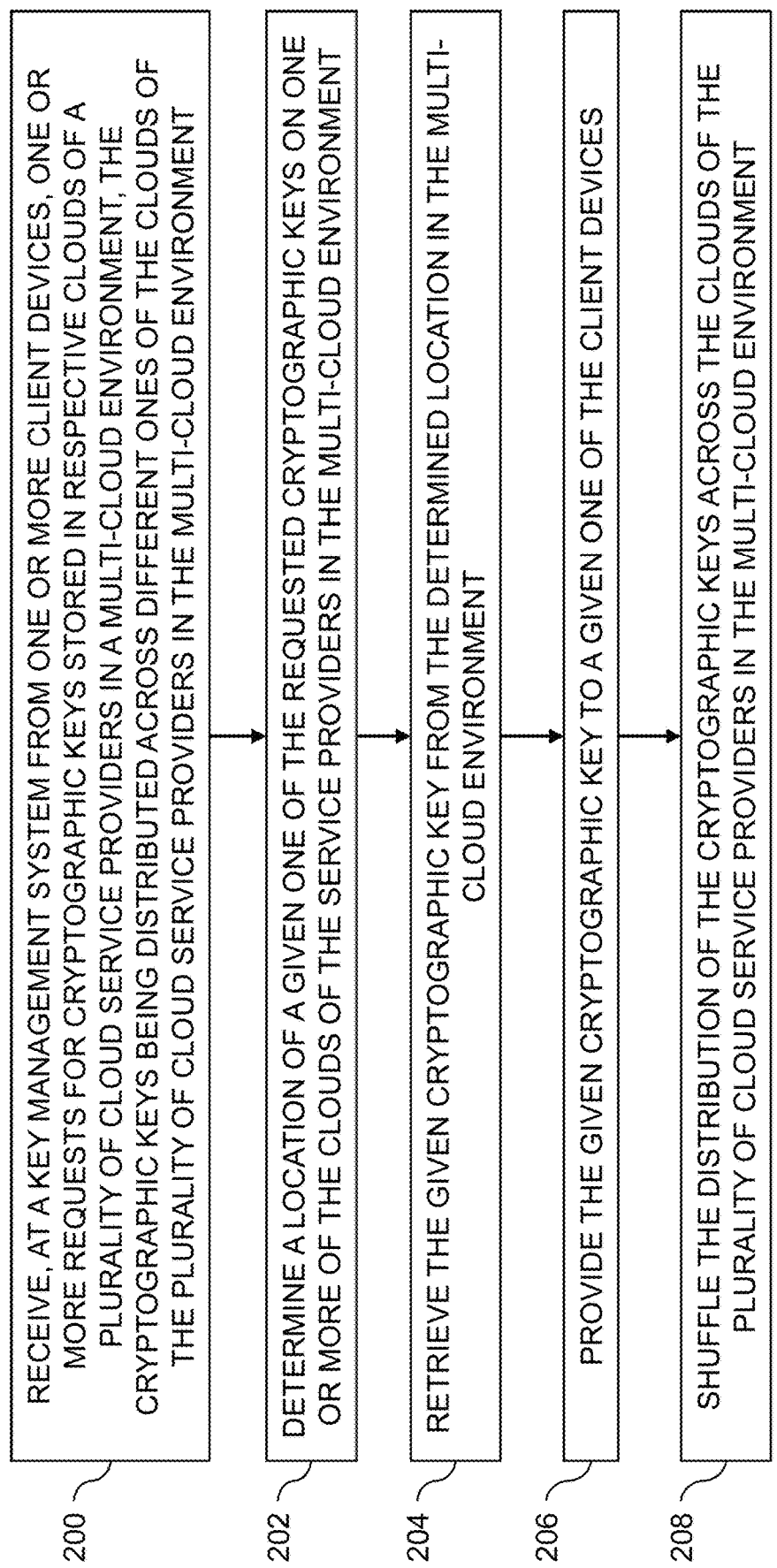
FIG. 2 is a flow diagram of an exemplary process for key shuffling in a multi-cloud environment in an illustrative embodiment.

An exemplary process for key shuffling in a multi-cloud environment will now be described in more detail with reference to the flow diagram of FIG. 2. It is to be understood that this particular process is only an example, and that additional or alternative processes for key shuffling in multi-cloud environments can be carried out in other embodiments.

In this embodiment, the process includes steps 200 through 208. These steps are assumed to be performed by the KMS 104 utilizing the shuffle index module 140.

The process begins with step 200, receiving, at a KMS from one or more client devices, one or more requests for cryptographic keys stored in respective clouds of a plurality of CSPs in a multi-cloud environment. The cryptographic keys are distributed across different ones of the clouds of the plurality of CSPs in the multi-cloud environment. In step 202, the KMS determines a location of a given one of the requested cryptographic keys on one or more of the clouds of the CSPs in the multi-cloud environment. The KMS retrieves the given cryptographic key from the determined location in the multi-cloud environment in step 204. The given cryptographic key is provided to the requesting client device in step 206, and the distribution of the cryptographic keys across the clouds of the plurality of CSPs in the multi-cloud environment is shuffled in step 208. The KMS performing the FIG. 2 process may be implemented on an additional CSP distinct from the plurality of CSPs in the multi-cloud environment on which the cryptographic keys are stored.

The requested cryptographic keys, as discussed elsewhere herein, may be Key Encryption Keys (KEKs) that are utilized to encrypt Data Encryption Keys (DEKs) that protect data stored in the multi-cloud environment.

The cryptographic keys may be distributed across the plurality of CSPs in the multi-cloud environment utilizing a tree structure, wherein the leaves of the tree structure store the cryptographic keys or portions thereof. The tree structure may by an unchained B+ tree. The internal nodes and the leaves of the tree structure are distributed among the plurality of CSPs in the multi-cloud environment. In some embodiments, the internal nodes and leaves are uniformly distributed among the plurality of CSPs in the multi-cloud environment. A given node of the tree structure may comprise a logical identifier, with the logical identifier comprising a first portion identifying a given one of the CSPs, a second portion identifying a level of the tree structure, and a third portion indicating a location within the given CSP.

In some embodiments, different portions of a key are distributed across clouds of multiple ones of the plurality of CSPs in the multi-cloud environment. For example, different portions of the given cryptographic key may be stored in clouds of two or more different CSPs in the multi-cloud environment. The plurality of CSPs in the multi-cloud environment provide confidentiality and integrity protection for the plurality of cryptographic keys or portions thereof stored thereon. Encryption may be used to provide confidentiality, and keyed-hash message authentication codes (HMACs) of the cryptographic keys may be used to provide integrity protection. The CSPs in the multi-cloud environment are not provisioned with knowledge of the ownership or associations of the cryptographic keys stored thereon.

In some embodiments, the shuffling step 208 is performed after each request that is received by the KMS. In other embodiments, the shuffling step 208 may be performed on a schedule, after a designated number of requests, responsive to a user request, etc. The shuffling in step 208 may involve moving each of the cryptographic keys, or at least a subset of the cryptographic keys including the given cryptographic key and one or more additional cryptographic keys not subject to the one or more requests received by the KMS, that are stored in the CSPs in the multi-cloud environment. For example, each cryptographic key is moved from a previous location on a cloud of one of the CSPs in the multi-cloud environment to a new location on a cloud of a different one of the CSPs in the multi-cloud environment. The re-distribution or movement of keys in the shuffling step 208 may be random or pseudo-random.

Embodiments address challenges of establishing trust in a KMS operating in a multi-cloud environment. Key management services are established to manage the protection of customer data in cloud environments, and to manage keys used to set up secure communication channels between clients and cloud services. In some cases, confidentiality of keys are protected through encryption schemes where KEKs are used to encrypt DEKs that protect data.

Figure 3:
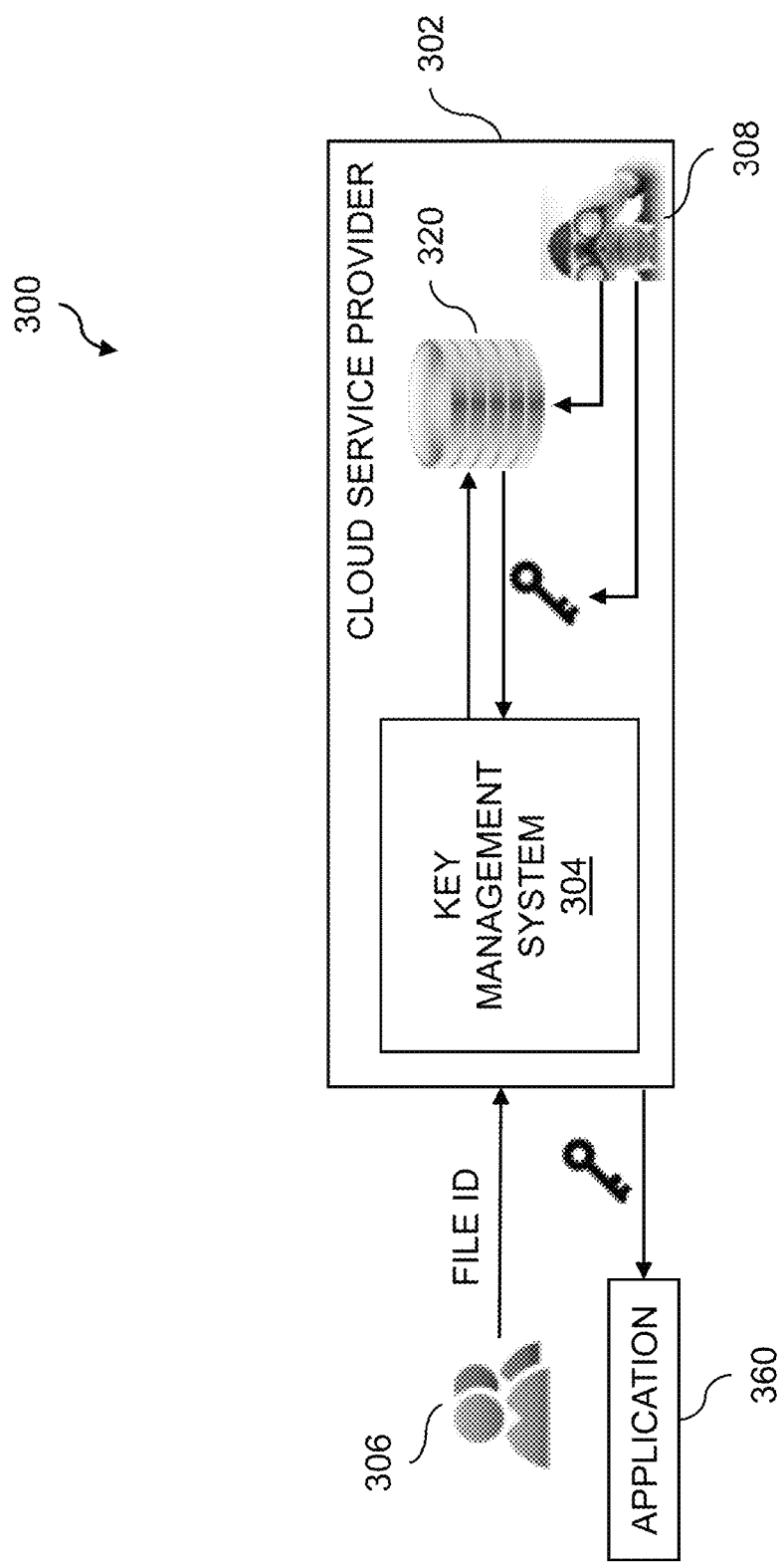
FIG. 3 shows a key management system implemented on a single cloud service provider in an illustrative embodiment.

There are a number of challenges with KEK/DEK approaches. First, KEKs themselves need to be securely stored within a CSP. This requires trust in the CSP that the CSP will not use the KEKs for any purpose other than responding to authorized entity requests for the KEKs. Another challenge is that the DEKs, though encrypted, can leak information through observation of usage patterns and mapping key requests (originating from key owners) to specific DEKs. This can form the first step in a targeted attack on a victim's data. Still another challenge is that a single CSP managing keys, depicted in the information processing system 300 of FIG. 3, is bound only by service level agreements (SLAs) to not breach the confidentiality of the keys and therefore the data that the keys protect. While SLAs offer some contractual obligations to implement security practices that prevent breaches of confidentiality of the keys, this is not an iron-clad solution and is vulnerable to rogue actors operating within the CSP.

FIG. 3 shows an information processing system 300 wherein a KMS 304 is implemented on a single CSP 302. The CSP 302 includes a key store or key database 320, which stores KEKs and/or DEKs for tenants, customers or other users of the CSP 302. A user or client device 306 can request a particular key from the KMS 304 of CSP 302 (e.g., a request for a file identifier (ID)). The KMS 304 authenticates the request, and obtains the requested key from the key store 320 on CSP 302. The KMS 304 then returns the requested key to the application 360 of the user or client device 306.

The FIG. 3 arrangement, however, is subject to a number of attack vectors from a malicious actor 308. First, the malicious actor 308 may intercept the requested key from the key store 320 by monitoring traffic to and from the key store 320. Encryption may be used to protect from this type of attack. The second attack vector is to recover keys directly from the key store 320. Assuming that information connecting users to specific keys is not stored adjacent to the keys themselves in the key store 320, the malicious actor 308 would need to observe a series of key requests to build a map between users and their requested keys. Some embodiments implement key shuffling to disrupt such an attack vector on KMS hosts, including side channel attacks for requesting keys to determine patterns.

Figure 4:
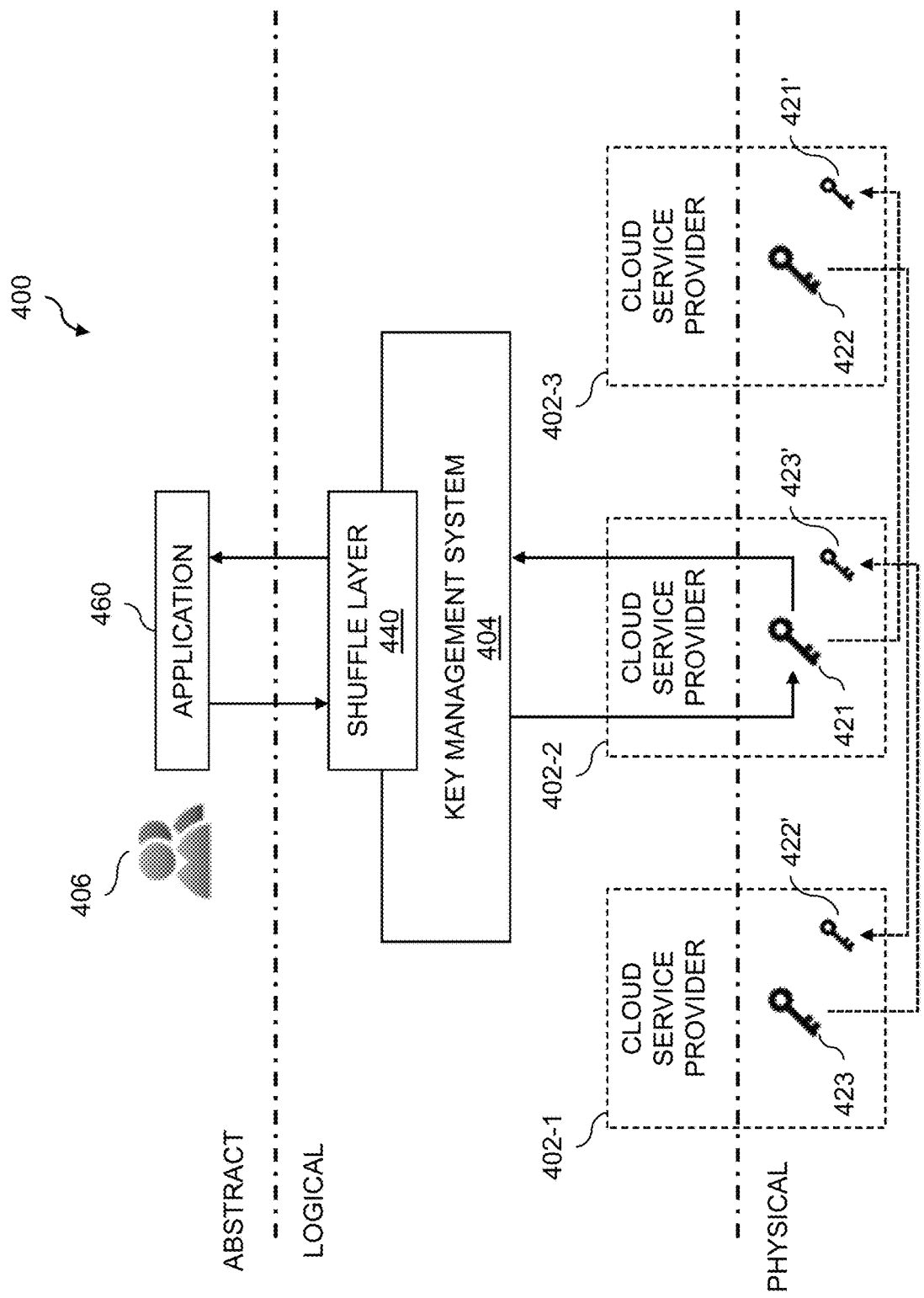
FIG. 4 shows an information processing system implementing key shuffling for a multi-cloud environment in an illustrative embodiment.

FIG. 4 illustrates an information processing system 400 with a KMS 404 implementing a shuffle layer 440 for keys distributed in a multi-cloud environment comprising CSPs 402-1, 402-2 and 402-3 (collectively, CSPs 402). The KMS 404 is augmented with the shuffle layer 440 to provide a shuffling mechanism that provides obfuscation between (i) logical key requests received from user or client device 406 and/or an associated application 460 and (ii) the physical location of keys on the CSPs 402. FIG. 4 illustrates a three-site configuration (e.g., with three CSPs 402) for distribution of keys. The KMS 404 and shuffle layer 440, for security purposes, are located at a fourth site (e.g., a fourth CSP) or on the client side. The three CSPs 402 act as secure containers for storing keys.

In the FIG. 4 example, a user application 460 requests a key 421 currently hosted on CSP 402-2. The shuffle layer 440 maintains indexing of the key locations, and directs the KMS 404 to the correct location to retrieve key 421 (e.g., to CSP 402-2). Simultaneously or otherwise in conjunction with or in association with the request, the indexing is shuffled and the KMS 404 directs the CSPs 402 to perform a series of PUT and GET operations on the keys so that they are redistributed across the CSPs 402. Thus, key 421 is moved from CSP 402-2 to CSP 402-3 (denoted by key 421'). Key 422 is moved from CSP 402-3 to CSP 402-1 (denoted by key 422'), and the key 423 is moved from CSP 402-1 to CSP 402-2 (denoted by key 423'). The CSPs 402 do not have knowledge of the ownership of or association between the keys and the user 406 or application 460, nor are the CSPs 402 able to infer any such knowledge through repeated key requests.

In some embodiments, each key request initiates a shuffling of the key locations. Every key may be shuffled during each shuffling. Since there are fewer KEKs than DEKs, it is more efficient to implement shuffling at the KEK level. In some embodiments, however, shuffling may be performed at the DEK level, or may involve shuffling both KEKs and DEKs or portions thereof. For example, in some embodiments KEKs are shuffled with each key request and DEKs are shuffled every k key requests, where k is an integer greater than one. In other embodiments, the KEKs and/or DEKs are shuffled periodically (e.g., each minute, hourly, daily, weekly, etc.) in addition to or in place of shuffling initiated in response to key requests.

Figure 5:
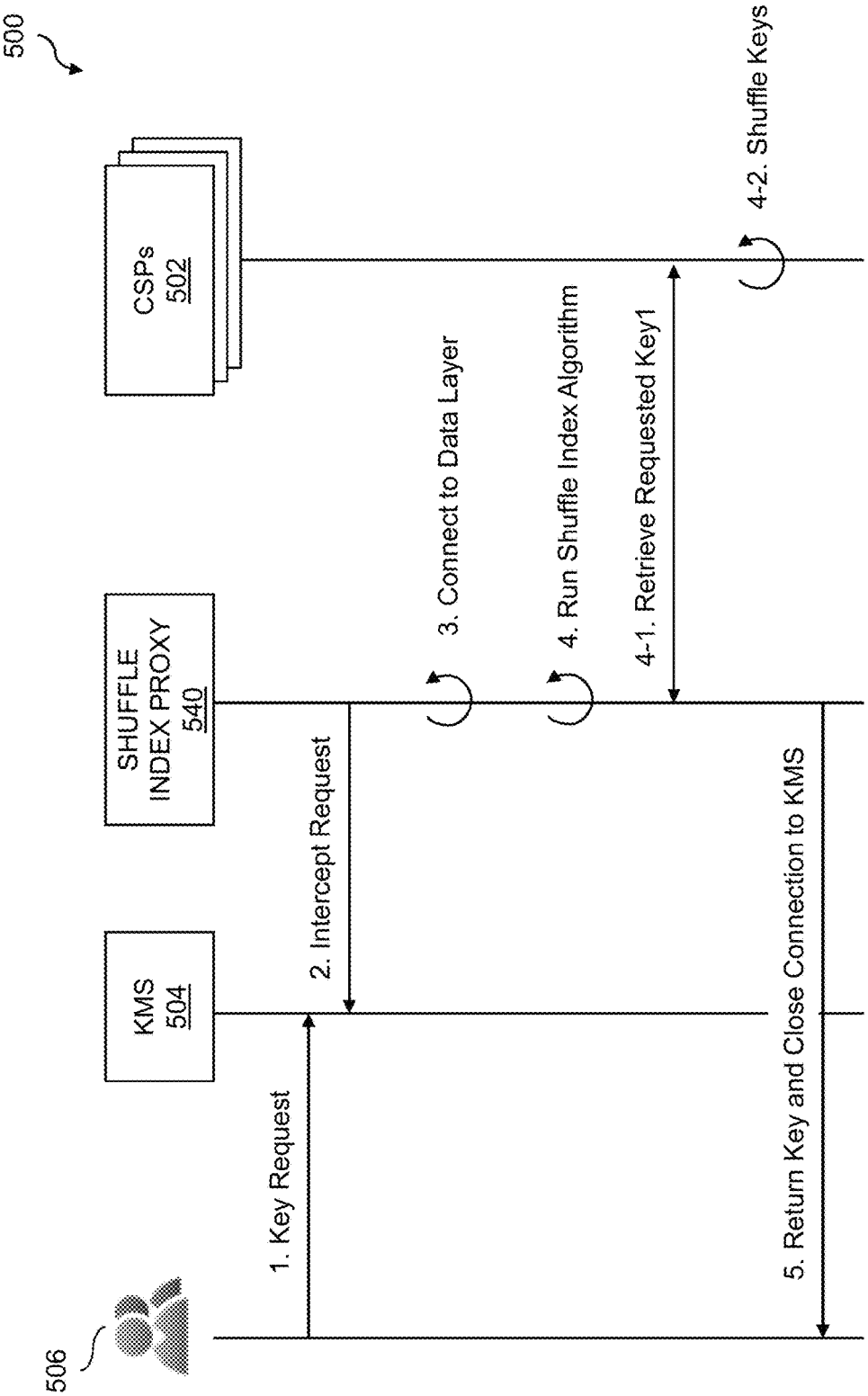
FIG. 5 shows a flow diagram for key shuffling in a multi-cloud environment in an illustrative embodiment.

FIG. 5 depicts a flow 500 of processing key requests and key shuffling, between a client 506, a KMS 504 implementing an associated shuffle layer or shuffle index proxy 540, and CSPs 502. The client 506 represents the application or service requesting a user's cryptographic key from the KMS 504. The KMS 504 is a third party service hosting user keys in a multi-cloud environment. The shuffle index proxy 540 is a proxy service which maintains a record of key locations for the KMS 504. The shuffle index proxy 540 provides functionality for obfuscating access patterns when users request their cryptographic keys, through the implementation of a distributed shuffle index in the key request path.

The KMS 504 has encryption mechanisms in place to protect the confidentiality of the cryptographic keys themselves. The KMS 504 is implemented in a multi-cloud configuration, and requests from client 506 are routed through the shuffle index proxy 540. Access to a data layer of the KMS 504 is enabled for the shuffle index proxy 540, and authorized on behalf of the client 506. The shuffle index proxy 540 is configured for the number of CSPs 502 in the multi-cloud environment storing the cryptographic keys. The shuffle index proxy is also configured for the depth and fan-out of the tree structure utilized to distribute keys amongst the CSPs 502. Requested cryptographic keys are returned to the client 506, and the shuffle index process is completed to balance the tree structure across the CSPs 502.

In step 1, client 506 submits a request for a cryptographic key to the KMS 504. The shuffle index proxy 540 intercepts the key request in step 2, and instantiates a connection to a data layer of the KMS 504 in step 3. The shuffle index proxy in step 4 runs an iteration of the shuffle index algorithm. Step 4 may include retrieving the requested cryptographic key from its location within the CSPs 502 in step 4-1. In step 4-2, leafs in the tree structure storing the cryptographic keys on CSPs 502 are shuffled such that the cryptographic keys are redistributed pseudo-randomly across the CSPs 502, and such that the tree remains balanced across the CSPs 502. In step 5, the shuffle index proxy 540 returns the cryptographic key to the client 506, and closes the connection to the KMS 504.

In some embodiments, the distributed shuffle index mechanism utilizes a tree structure for distributing the cryptographic keys across multiple CSPs. The tree structure may be an unchained B+ tree, or a B+ tree with no links between leaves, with fan-out F defined over candidate key K. Resources are stored in the leaves, where internal nodes and leaves are distributed amongst the CSPs in a multi-cloud environment. In some embodiments, the internal nodes and leaves are distributed amongst three CSPs, which provides a good balance between performance and security. It is to be appreciated, however, that embodiments are not limited to shuffling amongst three CSPs and that shuffling may be implemented for various other numbers of CSPs.

Each of the nodes of the B+ tree has a logical identifier, and is allocated at one of the CSPs. The logical identifiers are translated at the physical level into a physical location where the data (e.g., a cryptographic key or portion thereof) is stored in one of the CSPs. The tree structure is evenly distributed across the CSPs, at a provider level and across the internal children of each node. For a three CSP arrangement, each CSP will store one third of the nodes in the shuffle index, and approximately one third of the children of each node. Mechanisms for confidentiality (e.g., encryption) and integrity (e.g., HMAC) are applied to the data stored at each node.

Figure 6:
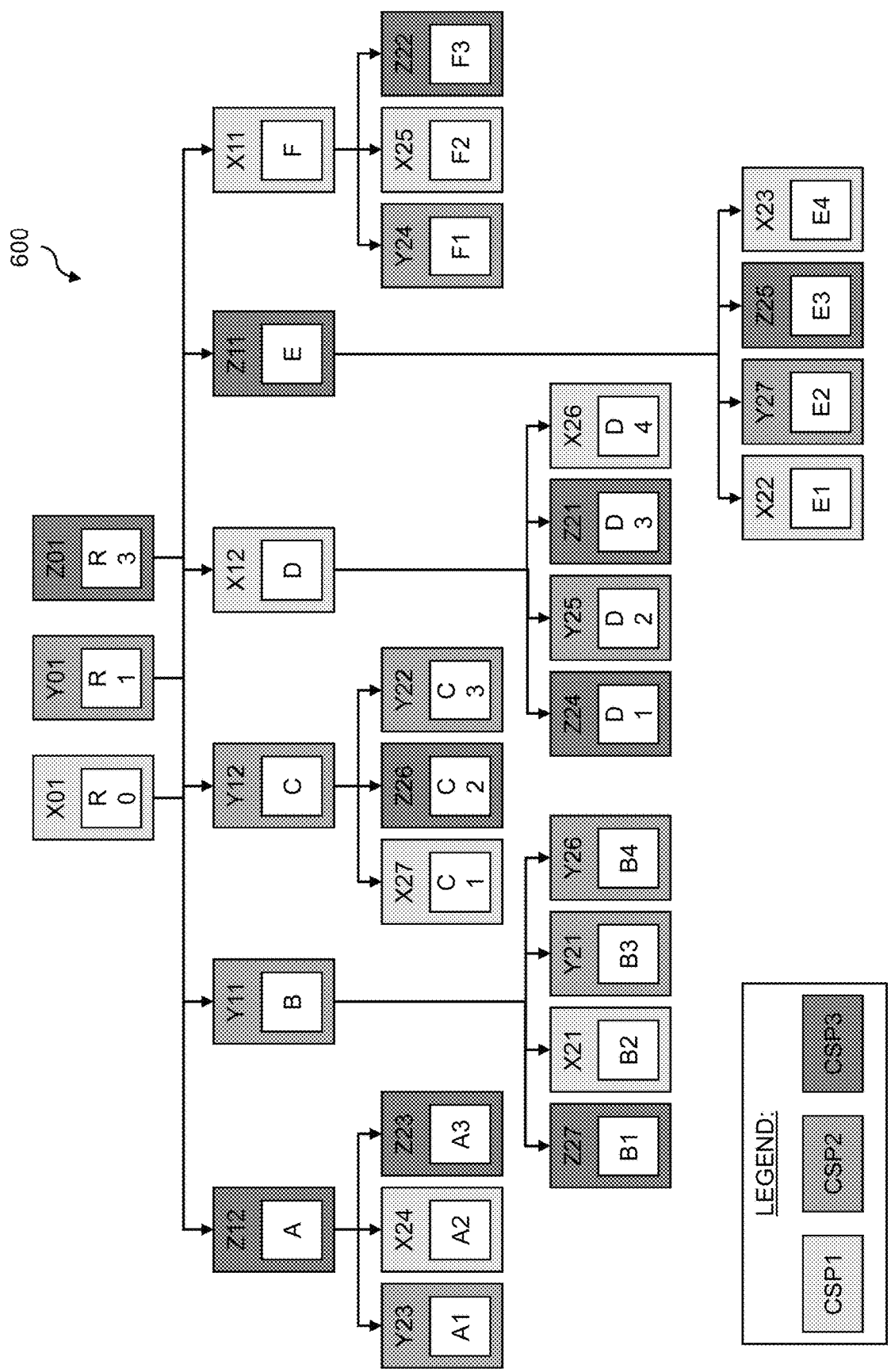
FIG. 6 shows an example of a shuffle index distributed across three cloud service providers in an illustrative embodiment.

FIG. 6 shows an example of a shuffle index 600 implemented for a three-CSP arrangement. Logical identifiers are indicated at the top of each node in the shuffle index 600 (e.g., X01, Y23, Z12, etc.). The letter at the beginning of the identifier indicates the CSP where the corresponding block is (e.g., one of CSP X, Y or Z), and the first digit indicates the level in the tree. For clarity, the different nodes in the shuffle index 600 are shaded differently as indicated in the legend, with light gray shading denoting the first CSP X, medium gray shading denoting the second CSP Y and the dark gray shading denoting the third CSP Z. The contents of each node are labeled A-F, with files split across the three CSPs as indicated.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
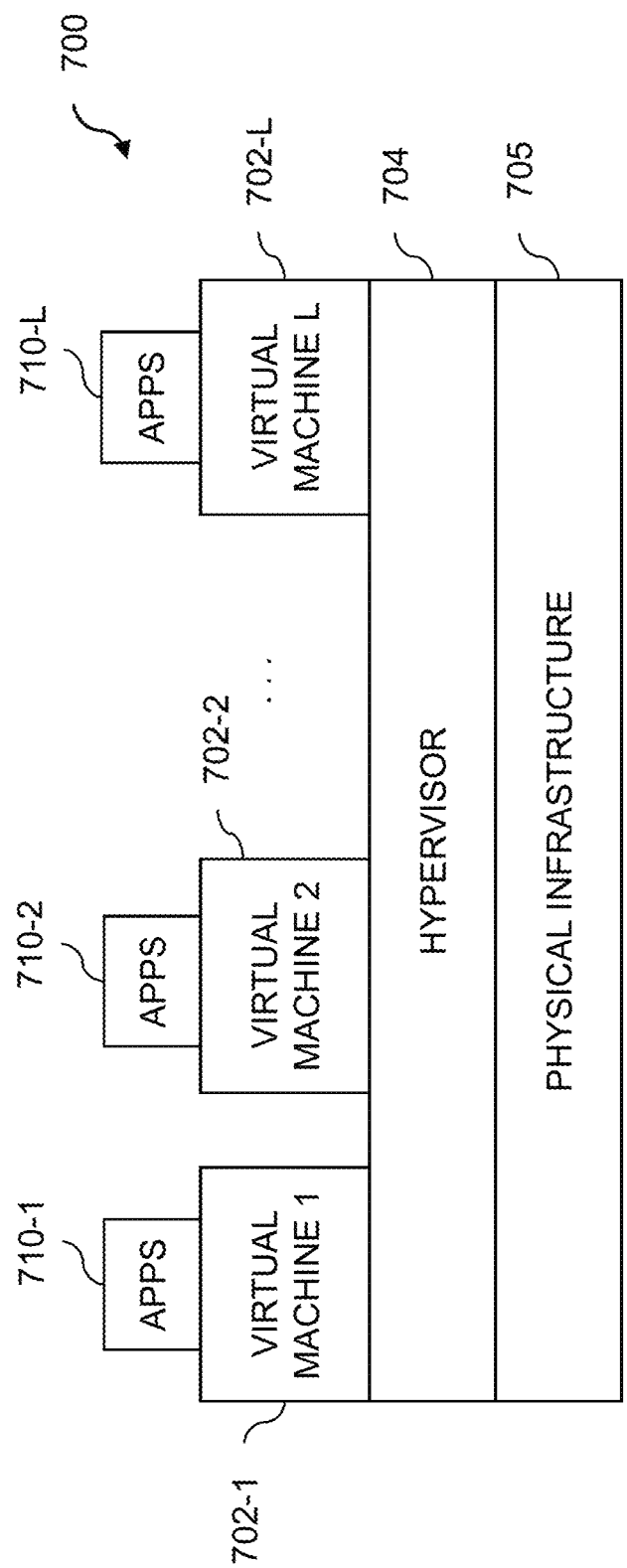
FIGS. 7 and 8 show examples of processing platforms that may be utilized to implement at least a portion of the FIG. 1 system.
Figure 8:
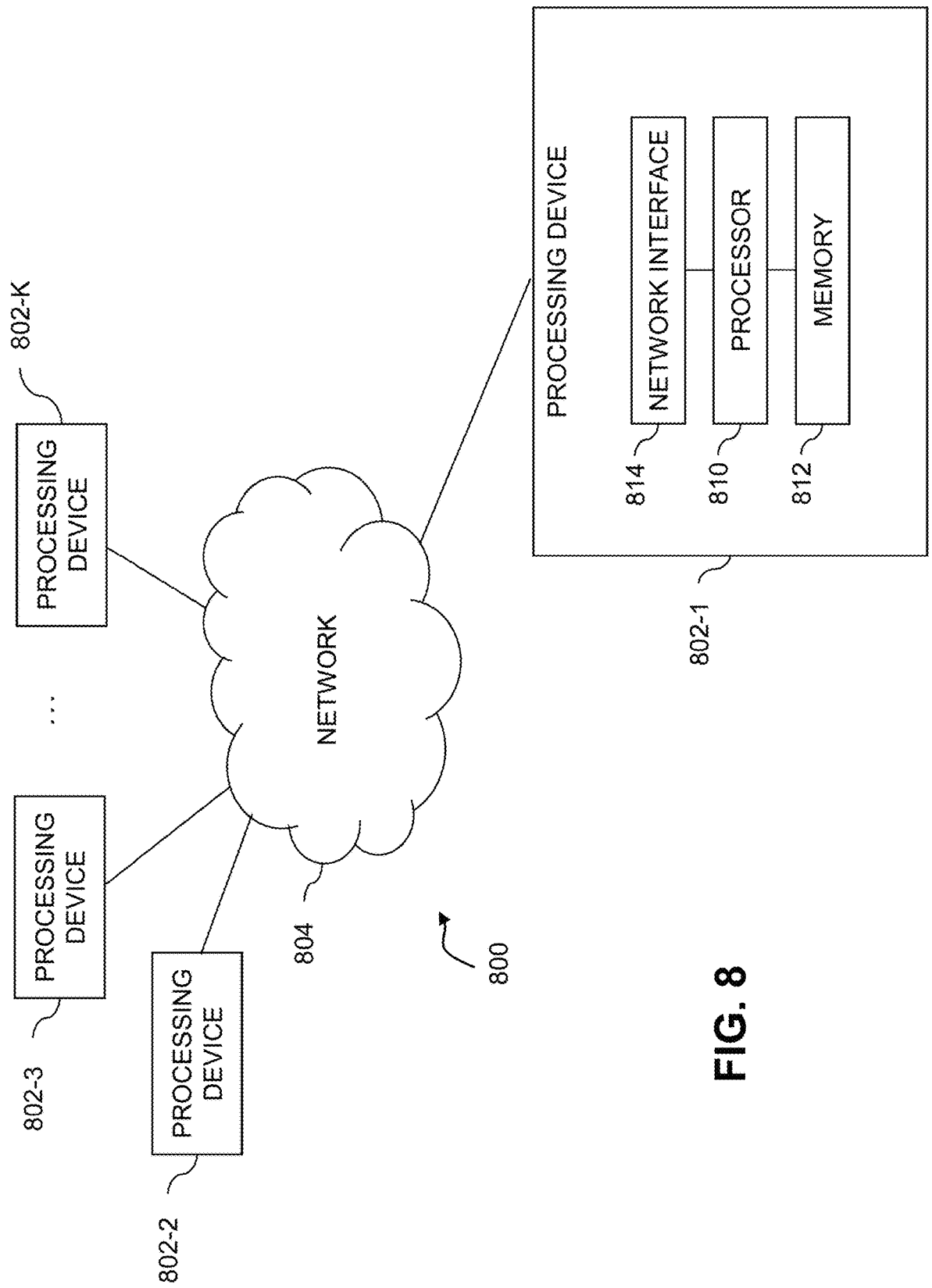

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises virtual machines (VMs) 702-1, 702-2, ... 702-L implemented using a hypervisor 704. The hypervisor 704 runs on physical infrastructure 705. The cloud infrastructure 700 further comprises sets of applications 710-1, 710-2, ... 710-L running on respective ones of the virtual machines 702-1, 702-2, ... 702-L under the control of the hypervisor 704.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 704 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, ... 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

These and numerous other alternative cloud computing environments or other types of processing platforms can be configured to implement functionality for shuffling of keys in a multi-cloud environment as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality described herein for shuffling keys in a multi-cloud environment are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide functionality for measuring code sharing described herein. Also, the particular configurations of system and device elements shown in the figures can be varied in other embodiments. Thus, for example, the particular type of shuffling, tree structure, numbers of nodes and CSPs, etc., may be varied. Other features of the illustrative embodiments can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
   receiving, at a key management system from one or more client devices, one or more requests for cryptographic keys stored in respective clouds of a plurality of cloud service providers in a multi-cloud environment, the cryptographic keys being distributed across different ones of the respective clouds of the plurality of cloud service providers in the multi-cloud environment;
   determining a location of a given one of the requested cryptographic keys on one or more of the clouds of the cloud service providers in the multi-cloud environment;
   retrieving the given cryptographic key from the determined location in the multi-cloud environment;
   providing the given cryptographic key to a given one of the client devices; and
   shuffling the distribution of the cryptographic keys across the clouds of the plurality of cloud service providers in the multi-cloud environment;
   wherein the method is performed by at least one processing device comprising a processor coupled to a memory.

2. The method of claim 1 wherein the key management system is implemented on an additional cloud of an additional cloud service provider distinct from the plurality of cloud service providers on which the cryptographic keys are stored.

3. The method of claim 1 wherein the given cryptographic key comprises a key encryption key (KEK) utilized to encrypt one or more data encryption keys (DEKs) that protect data stored in the multi-cloud environment.

4. The method of claim 1 wherein the cryptographic keys are distributed across the clouds of the plurality of cloud service providers in the multi-cloud environment utilizing a tree structure, and wherein portions of the cryptographic keys are stored in leaves of the tree structure.

5. The method of claim 4 wherein the tree structure comprises an unchained B+ tree structure.

6. The method of claim 4 wherein internal nodes and the leaves of the tree structure are distributed among the clouds of the plurality of cloud service providers in the multi-cloud environment.

7. The method of claim 4 wherein a given node of the tree structure comprises a logical identifier, the logical identifier comprising:
   a first portion identifying a given one of the cloud service providers;
   a second portion identifying a level of the tree structure; and
   a third portion indicating a location on a given cloud within the given cloud service provider.

8. The method of claim 1 wherein the given cryptographic key comprises two or more portions distributed across clouds of two or more of the plurality of cloud service providers in the multi-cloud environment.

9. The method of claim 1 wherein the plurality of cloud service providers in the multi-cloud environment provide confidentiality and integrity protection for the plurality of cryptographic keys stored thereon.

10. The method of claim 9 wherein the plurality of cloud service providers utilize encryption of the cryptographic keys to provide confidentiality and keyed-hash message authentication codes (HMACs) of the cryptographic keys to provide integrity protection.

11. The method of claim 1 wherein the plurality of cloud service providers in the multi-cloud environment are not provisioned with knowledge of the ownership or associations of the cryptographic keys stored thereon.

12. The method of claim 1 wherein shuffling the distribution of the cryptographic keys across the clouds of the plurality of cloud service providers in the multi-cloud environment is performed responsive to each of the one or more requests received at the key management system.

13. The method of claim 12 wherein shuffling the distribution of the cryptographic keys across the clouds of the plurality of cloud service providers comprises moving each of the cryptographic keys from a previous location on a cloud of one of the cloud service providers in the multi-cloud environment to a new location on a cloud of a different one of the cloud service providers in the multi-cloud environment.

14. The method of claim 1 wherein shuffling the distribution of the cryptographic keys across the clouds of the plurality of cloud service providers comprises re-distributing the cryptographic keys pseudo-randomly across the clouds of the plurality of cloud service providers in the multi-cloud environment.

15. A computer program product comprising a non-transitory processor-readable storage medium having stored therein program code of one or more software programs, wherein the program code when executed by at least one processing device cause the at least one processing device:

to receive, at a key management system from one or more client devices, one or more requests for cryptographic keys stored in respective clouds of a plurality of cloud service providers in a multi-cloud environment, the cryptographic keys being distributed across different ones of the respective clouds of the plurality of cloud service providers in the multi-cloud environment;

to determine a location of a given one of the requested cryptographic keys on one or more of the clouds of the cloud service providers in the multi-cloud environment;

to retrieve the given cryptographic key from the determined location in the multi-cloud environment;

to provide the given cryptographic key to a given one of the client devices; and to shuffle the distribution of the cryptographic keys across the clouds of the plurality of cloud service providers in the multi-cloud environment.

16. The computer program product of claim 15 wherein shuffling the distribution of the cryptographic keys across the clouds of the plurality of cloud service providers in the multi-cloud environment is performed responsive to each of the one or more requests received at the key management system, and wherein shuffling the distribution of the cryptographic keys across the clouds of the plurality of cloud service providers comprises moving each of the cryptographic keys from a previous location on a cloud of one of the cloud service providers in the multi-cloud environment to a new location on a cloud of a different one of the cloud service providers in the multi-cloud environment.

17. The computer program product of claim 15 wherein the cryptographic keys are distributed across the clouds of the plurality of cloud service providers in the multi-cloud environment utilizing a tree structure, and wherein portions of the cryptographic keys are stored in leaves of the tree structure.

18. An apparatus comprising:

at least one processing device comprising a processor coupled to a memory;

the at least one processing device being configured:

to receive, at a key management system from one or more client devices, one or more requests for cryptographic keys stored in respective clouds of a plurality of cloud service providers in a multi-cloud environment, the cryptographic keys being distributed across different ones of the respective clouds of the plurality of cloud service providers in the multi-cloud environment;

to determine a location of a given one of the requested cryptographic keys on one or more of the clouds of the cloud service providers in the multi-cloud environment;

to retrieve the given cryptographic key from the determined location in the multi-cloud environment;

to provide the given cryptographic key to a given one of the client devices; and to shuffle the distribution of the cryptographic keys across the clouds of the plurality of cloud service providers in the multi-cloud environment.

19. The apparatus of claim 18 wherein shuffling the distribution of the cryptographic keys across the clouds of the plurality of cloud service providers in the multi-cloud environment is performed responsive to each of the one or more requests received at the key management system, and wherein shuffling the distribution of the cryptographic keys across the clouds of the plurality of cloud service providers comprises moving each of the cryptographic keys from a previous location on a cloud of one of the cloud service providers in the multi-cloud environment to a new location on a cloud of a different one of the cloud service providers in the multi-cloud environment.

20. The apparatus of claim 18 wherein the cryptographic keys are distributed across the clouds of the plurality of cloud service providers in the multi-cloud environment utilizing a tree structure, and wherein portions of the cryptographic keys are stored in leaves of the tree structure.

* * * * *